(12) United States Patent
Kim et al.

(10) Patent No.: US 11,848,448 B2
(45) Date of Patent: Dec. 19, 2023

(54) LITHIUM SECONDARY BATTERY

(71) Applicant: LG CHEM, LTD., Seoul (KR)

(72) Inventors: Taek Gyoung Kim, Daejeon (KR); Seung Yoon Yang, Daejeon (KR); Eunji Jang, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 250 days.

(21) Appl. No.: 16/769,137

(22) PCT Filed: Mar. 6, 2019

(86) PCT No.: PCT/KR2019/002583
§ 371 (c)(1),
(2) Date: Jun. 2, 2020

(87) PCT Pub. No.: WO2019/172637
PCT Pub. Date: Sep. 12, 2019

(65) Prior Publication Data
US 2021/0175505 A1 Jun. 10, 2021

(30) Foreign Application Priority Data

| Mar. 9, 2018 | (KR) | 10-2018-0028232 |
| Sep. 28, 2018 | (KR) | 10-2018-0115455 |
| Sep. 28, 2018 | (KR) | 10-2018-0115459 |
| Sep. 28, 2018 | (KR) | 10-2018-0115462 |
| Dec. 21, 2018 | (KR) | 10-2018-0167032 |

(51) Int. Cl.
H01M 4/62 (2006.01)
H01M 10/0525 (2010.01)
H01M 4/02 (2006.01)

(52) U.S. Cl.
CPC ....... *H01M 4/621* (2013.01); *H01M 10/0525* (2013.01); *H01M 2004/027* (2013.01); *H01M 2004/028* (2013.01)

(58) Field of Classification Search
CPC ............... H01M 4/5815; H01M 4/136; H01M 2004/028; H01M 10/0525; Y02E 60/10; Y02P 70/50; Y02T 10/70
See application file for complete search history.

(56) References Cited

U.S. PATENT DOCUMENTS

| 5,698,176 A | 12/1997 | Capparella et al. |
| 2003/0143462 A1 | 7/2003 | Han et al. |
| 2003/0162099 A1 | 8/2003 | Bowden et al. |
| 2006/0040180 A1 | 2/2006 | Ivanov et al. |
| 2006/0121350 A1 | 6/2006 | Kajiya et al. |
| 2009/0302267 A1 | 12/2009 | Albrecht et al. |
| 2010/0273048 A1 | 10/2010 | Machida et al. |
| 2012/0141868 A1 | 6/2012 | Hirano |
| 2013/0181160 A1 | 7/2013 | Wietelmann |
| 2014/0322612 A1* | 10/2014 | Wietelmann .......... H01M 4/366 429/231.95 |
| 2015/0010826 A1 | 1/2015 | Wietelmann et al. |
| 2015/0072248 A1* | 3/2015 | Watanabe ............... H01M 4/38 429/188 |
| 2016/0133992 A1 | 5/2016 | Voiti et al. |
| 2016/0351889 A1* | 12/2016 | Swonger .................. C25C 7/00 |
| 2017/0309909 A1 | 10/2017 | Paulsen et al. |
| 2018/0062178 A1* | 3/2018 | Oota ....................... H01M 4/04 |
| 2018/0248227 A1 | 8/2018 | Park et al. |

FOREIGN PATENT DOCUMENTS

| CN | 1434525 A | 8/2003 | |
| CN | 1839893 A | 7/2005 | |
| CN | 1741314 A | 3/2006 | |
| CN | 101418406 A | 4/2009 | |
| CN | 107636204 A | 1/2018 | |
| JP | H7-235309 A | 9/1995 | |
| JP | 11-506721 A | 6/1999 | |
| JP | 2002-15740 A | 1/2002 | |
| JP | 2002-33100 A | 1/2002 | |
| JP | 2005-519441 A | 6/2005 | |
| JP | 2007-265731 A | 10/2007 | |
| JP | 2011-71111 A | 4/2011 | |
| JP | 2012-21123 A | 2/2012 | |
| JP | 2014-175135 A | 2/2012 | |
| JP | 2013-545886 A | 12/2013 | |
| KR | 10-2003-0063060 A | 7/2003 | |
| KR | 100485092 B1 * | 2/2004 | ............. Y02E 60/10 |
| KR | 10-2007-0060784 A | 6/2007 | |
| KR | 10-2008-0043347 A | 5/2009 | |
| KR | 10-2010-0118064 A | 11/2010 | |
| KR | 10-2014-0123069 A | 10/2014 | |
| KR | 10-2017-0065635 A | 6/2017 | |
| KR | 10-2017-0092455 A | 8/2017 | |
| KR | 10-2017-0117540 A | 10/2017 | |

(Continued)

OTHER PUBLICATIONS

Machine translation of KR100485092B1 (Year: 2004).*
Chong, Jin, et al. "A comparative study of polyacrylic acid and poly (vinylidene difluoride) binders for spherical natural graphite/ LiFePO4 electrodes and cells." Journal of power sources 196.18 (2011): 7707-7714. (Year: 2011).*
Machine translation of WO 2019117056 A1 (Year: 2019).*
Extended European Search Report for European Application No. 19763807.5, dated Dec. 16, 2020.
International Search Report (PCT/ISA/210) issued in PCT/KR2019/002583, dated Oct. 30, 2019.

Primary Examiner — Sadie White
Assistant Examiner — Kayla Elaine Clary
(74) Attorney, Agent, or Firm — Birch, Stewart, Kolasch & Birch, LLP

(57) ABSTRACT

A lithium secondary battery, and more particularly, to a lithium secondary battery having improved performance by minimizing the content of impurities such as sodium in the battery.

2 Claims, No Drawings

(56) References Cited

FOREIGN PATENT DOCUMENTS

KR    10-2017-0129092 A    11/2017
WO    WO2016/013674    1/2016
WO    WO-2019117056 A1 *  6/2019    .............. H01M 4/62

* cited by examiner

LITHIUM SECONDARY BATTERY

TECHNICAL FIELD

The present application claims the benefit of priority based on Korean Patent Application No. 10-2018-0028232 filed on Mar. 9, 2018, Korean Patent Application No. 10-2018-0115455 filed on Sep. 28, 2018, Korean Patent Application No. 10-2018-0115459 filed on Sep. 28, 2018, Korean Patent Application No. 10-2018-0115462 filed on Sep. 28, 2018, and Korean Patent Application No. 10-2018-0167032 filed on Dec. 21, 2018, all the contents of which are incorporated herein by reference.

The present invention relates to a lithium secondary battery, and more particularly, to a lithium secondary battery having improved battery performance by minimizing the content of impurities contained in the battery.

BACKGROUND ART

As technology development and demand for mobile devices increase, the demand for secondary batteries as energy sources is rapidly increasing. Among these secondary batteries, a lithium secondary battery with high energy density and voltage, long cycle lifetime, and low self-discharging rate has been commercialized and widely used.

In addition, as the secondary battery is attracting attention as a power source for an electric vehicle (EV) and a hybrid electric vehicle (HEV) which are proposed as a way to solve air pollution caused by conventional gasoline vehicles and diesel vehicles using a fossil fuel, since in recent years, its usage is expected to increase further, studies have been consistently conducted to improve performance and lifetime characteristics of the battery.

In recent years, the high content of impurities is recognized as one of the factors affecting the performance and lifetime characteristics of the secondary batteries. At this time, the impurities in the secondary battery may be alkaline metals, specifically Na metal.

It has also been reported that, even in the conventional lithium ion battery (LIB) in which lithium inorganic oxide is a positive electrode active material and graphite is a negative electrode, particularly, Na ions existing in the positive electrode deteriorate the mobility of Li ions and adversely affect the physical properties of the electrode.

Particularly, in the case of a lithium metal battery (typical example: Li—S battery) in which lithium metal (Li metal) is a negative electrode, it has been known that the presence of alkali metal ions contained in the positive electrode, the lithium negative electrode, the electrolyte solution, the separator, and the like is a problem.

Korean Laid-open Patent Publication No. 2017-0065635 discloses a method for improving electrochemical performance by limiting the contents of sodium and sulfur, which are impurities contained in the carbonate precursor compound to prepare a lithium metal oxide powder which can be used as a material of the positive electrode active material comprised in a lithium ion battery, to a specific content range, but presenting sodium to sulfur mole ratio (Na/S, 0.4<Na/S<2); sum of sodium content (Nawt) and sulfur content (Swt) (greater than 0.4 wt. % and less than 1.6 wt. %); and the sodium content (0.1 to 0.7 wt %) in the sum of the sodium content (Nawt) and the sulfur content (Swt) as specific numerical ranges to limit the content of impurities.

In addition, Korean Laid-open Patent Publication No. 2008-0043347 also discloses that the quality of the final product, i.e., the compound for the positive electrode material, can be guaranteed by limiting the content of sodium in the compound that can be used as a material for manufacturing the positive electrode material of the lithium secondary battery to less than 2,000 ppm.

Accordingly, there is a continuing need to develop a further improved lithium metal battery capable of improving the performance and lifetime of the battery by controlling the content of alkali metals such as sodium in components constituting a lithium metal battery comprising a lithium negative electrode.

[Prior Art Document]
[Patent Document]
(Patent Document 1) Korean Laid-open Patent Publication No. 2017-0065635 (Jun. 13, 2017).
(Patent Document 2) Korean Laid-open Patent Publication No. 2008-0043347 (May 16, 2008).

DISCLOSURE

Technical Problem

Therefore, as a result of various studies to solve the above problems, the inventors of the present invention have found that the performance and lifetime characteristics of a lithium secondary battery can be improved by reducing the sodium content in the lithium secondary battery as a whole and also optimizing the content of sodium contained in each component of the lithium secondary battery.

Accordingly, it is an object of the present invention to provide a lithium secondary battery in which the content of sodium contained in the lithium secondary battery is controlled.

Technical Solution

In order to achieve the above object, the present invention provides a lithium secondary battery wherein a content of sodium in the battery is no more than 500 ppm.

Advantageous Effects

The lithium secondary battery according to the present invention may have improved battery performance and lifetime characteristics by minimizing the sodium content.

Also, by minimizing the content of sodium contained in the positive electrode binder of the lithium secondary battery, it is possible to prevent the decreasing phenomenon in the capacity and the Coulomb efficiency depending on the increase of the charging/discharging cycles.

Also, by minimizing the content of sodium contained in the electrolyte solution of the lithium secondary battery, it is possible to prevent the decreasing phenomenon in the capacity and the Coulomb efficiency depending on the increase of the charging/discharging cycles, as well as to prevent the deterioration of the lithium efficiency.

Also, by minimizing the content of sodium contained in the positive electrode additive of the lithium secondary battery, it is possible to prevent the decreasing phenomenon in the capacity and the Coulomb efficiency depending on the increase of the charging/discharging cycles.

BEST MODE

Hereinafter, the present invention will be described in detail with reference to the drawings. The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Therefore, the constitution described in the drawings and the embodiments described herein are merely the most preferred embodiment of the present invention, and does not represent all the technical ideas of the present invention, and thus it should be understood that various equivalents and modifications may be substituted for them at the time of filing of the present application.

Lithium Secondary Battery

The present invention relates to a lithium secondary battery in which the content of alkali metals is minimized. For example, the lithium secondary battery comprises a lithium metal battery, a lithium metal ion battery, a lithium-sulfur battery, and a lithium air battery, but is not limited as long as the battery uses lithium as a negative electrode.

The alkali metal may comprise at least one of sodium (Na), potassium (K), and rubidium (Rb).

The alkali metal is recognized as an impurity in the lithium secondary battery, and thus as the content in the battery increases, there is a problem that the Coulomb efficiency also decreases sharply in addition to the capacity reduction phenomenon depending on charging/discharging lifetime.

As described above, the content of alkali metals contained in the lithium secondary battery has a direct correlation with the improvement of the battery performance, and thus the present invention relates to a lithium secondary battery configured to minimize the content of alkali metals contained in the lithium secondary battery.

In the lithium secondary battery according to the present invention, the content of sodium among the alkali metals may have a greater influence on the battery performance, thereby providing a lithium secondary battery with minimized the content of sodium.

In the lithium secondary battery according to the present invention, the content of sodium in the battery may be no more than 500 ppm. The sodium may be in the form of sodium ion ($Na^+$).

The lithium secondary battery according to the present invention comprises a positive electrode; a lithium negative electrode; a separator interposed between the positive electrode and the lithium negative electrode; and an electrolyte solution, and sodium may be contained in the positive electrode lithium negative electrode and the electrolyte solution.

Accordingly, the content of sodium in the lithium secondary battery of the present invention may be the content of sodium contained in the positive electrode, the lithium negative electrode, and the electrolyte solution of the lithium secondary battery. More specifically, the content of sodium may refer to the content of sodium contained in the binder contained in the positive electrode of the lithium secondary battery, the lithium negative electrode, and the electrolyte solution.

Within the range of no more than 500 ppm, the lower the content of sodium is, the more likely it will be advantageous in views of the lifetime and the capacity of the battery. For example, the content of sodium may be no more than 500 ppm, no more than 450 ppm, or no more than 400 ppm, or no more than 350 ppm, or no more than 300 ppm, or no more than 250 ppm, or no more than 200 ppm, or no more than 150 ppm, or no more than 100 ppm, or no more than 90 ppm, or no more than 80 ppm, or no more than 70 ppm, or no more than 60 ppm, or no more than 50 ppm, or no more than 40 ppm, or no more than 30 ppm, or no more than 25 ppm, or no more than 20 ppm, or no more than 15 ppm.

When the content of sodium in the lithium secondary battery is more than the above range, the amount of sodium recognized as an impurity in the battery is excessive, thereby causing a problem that the Coulomb efficiency also decreases sharply in addition to the capacity reduction phenomenon depending on charging/discharging lifetime.

Specifically, the excessive amount of sodium contained in the positive electrode, the lithium negative electrode, and the electrolyte solution migrates toward the lithium negative electrode, and then may interfere with the uniform reaction activity of the surface of the lithium negative electrode while occurring an undesired side reaction on the surface of lithium. In addition, the non-uniform reaction of lithium may adversely affect the lifetime of the battery because the phenomenon in which the side reaction and consumption of the electrolyte solution on the surface are sharply accompanied occurs.

Since the content of sodium contained in the positive electrode among the positive electrode, the lithium negative electrode, and the electrolyte solution which are the components comprised in the lithium secondary battery and contain sodium may be relatively large, the lower the content of the sodium in the positive electrode of the lithium secondary battery is, the more likely it will be advantageous in views of the lifetime and the capacity of the battery.

In addition, since the content of sodium in the positive electrode contained in the binder among the components comprised in the positive electrode of the lithium secondary battery may be relatively large as compared with the positive electrode active material or the conductive material, the lower the content of sodium in the positive electrode binder is, the more likely it will be advantageous in views of the lifetime and the capacity of the battery.

Hereinafter, the lithium secondary battery according to the present invention will be described in more detail with respect to the content of the sodium comprised in each of the positive electrode, the lithium negative electrode, and the electrolyte solution in the lithium secondary battery according to the present invention, which are the components containing sodium.

Positive Electrode

In the present invention, the positive electrode of the lithium secondary battery may comprise a positive electrode current collector and a positive electrode active material layer formed on the positive electrode current collector. The positive electrode active material layer may comprise a positive electrode active material, a binder, and a conductive material, and may optionally further comprise a positive electrode additive.

The content of sodium contained in the positive electrode among the total content of sodium contained in the lithium secondary battery may be no more than 450 ppm based on the total content in lithium secondary battery. For example, if the total content of sodium in the lithium secondary battery is 500 ppm based on the total content in the lithium secondary battery, the content of sodium contained in the positive electrode among them may be no more than 450 ppm based on the total content in the lithium secondary battery.

Specifically, the content of sodium contained in the positive electrode among the total content of sodium contained in the lithium secondary battery may be no more than 450 ppm, or no more than 350 ppm, or no more than 250 ppm, or no more than 150 ppm, or no more than 50 ppm, or no more than 40 ppm, or no more than 30 ppm, or no more than 20 ppm, or no more than 15 ppm, or no more than 10 ppm, or no more than 5 ppm, or no more than 2 ppm relative to the total content in the lithium secondary battery.

Within the ranges described above, the lower the content of sodium contained in the positive electrode based on the total content in the lithium secondary battery is, the more likely it will be advantageous in performance and lifetime characteristics of the battery. On the contrary, as the content of sodium contained in the positive electrode increases, sodium ions migrate toward the lithium negative electrode, and then may interfere with the uniform reaction activity of the surface of the lithium negative electrode while occurring an undesired side reaction on the surface of lithium. In addition, the non-uniform reaction of lithium may adversely affect the lifetime of the battery because the phenomenon in which the side reaction and consumption of the electrolyte solution on the surface are sharply accompanied occurs.

In the present invention, the positive electrode current collector supports the positive electrode active material layer and is not particularly limited as long as it has high electrical conductivity without causing chemical changes in the battery. For example, copper, stainless steel, aluminum, nickel, titanium, palladium, sintered carbon; copper or stainless steel whose surface is treated with carbon, nickel, silver; aluminum-cadmium alloys, etc. can be used as the positive electrode current collector.

The positive electrode current collector has fine irregularities formed on its surface to enhance the bonding force with the positive electrode active material and can be used in various forms such as film, sheet, foil, mesh, net, porous substance, foam, nonwoven fabric.

In the present invention, the positive electrode active material layer formed on the positive electrode current collector may comprise a positive electrode active material, a binder, and a conductive material.

The positive electrode active material among the components constituting the positive electrode active material layer in the positive electrode of the present invention may comprise, but is not limited to, at least one selected from the group consisting of lithium cobalt oxide, lithium nickel cobalt manganese oxide, lithium nickel cobalt aluminum oxide, lithium iron phosphate, and lithium manganese oxide, and may be any positive electrode active material available in the art.

For example, the positive electrode active material may be a compound represented by any one of the formulas of $Li_aA_{1-b}B_bD_2$ (wherein $0.90 \leq a \leq 1.8$, and $0 \leq b \leq 0.5$); $Li_aE_{1-b}B_bO_{2-c}D_c$ (wherein $0.90 \leq a \leq 1.8$, $0 \leq b \leq 0.5$, $0 \leq c \leq 0.05$); $LiE_{2-b}B_bO_{4-c}D_c$ (wherein $0 \leq b \leq 0.5$, $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, $0 < \alpha < 2$); $Li_aNi_bE_cG_dO_2$ (wherein $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (wherein $0.90 \leq a \leq 1.8$, $0.001 \leq b \leq 0.1$); $Li_aCoG_bO_2$ (wherein $0.90 \leq a \leq 1.8$, $0.001 \leq b \leq 0.1$); $Li_aMnG_bO_2$ (wherein $0.90 \leq a \leq 1.8$, $0.001 \leq b \leq 0.1$); $Li_aMn_2G_bO_4$ (wherein $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; $LiFePO_4$.

In the above formulas, A is Ni, Co, Mn, or a combination thereof; B is Al, Ni, Co, Mn, Cr, Fe, Mg, Sr, V, a rare earth element or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or combinations thereof; Q is Ti, Mo, Mn, or a combination thereof; I is Cr, V, Fe, Sc, Y, or a combination thereof; J is V, Cr, Mn, Co, Ni, Cu, or a combination thereof.

In particular, the positive electrode active material used in a lithium-sulfur battery may be, but is not limited to, elemental sulfur ($S_8$), sulfur-based compounds or mixtures thereof. The sulfur-based compound may specifically be $Li_2S_n$ ($n \geq 1$), an organic sulfur compound or a carbon-sulfur polymer (($C_2S_x)_n$: $x=2.5\sim50$, $n \geq 2$).

The binder among the components constituting the positive electrode active material layer in the positive electrode of the present invention is a material that is comprised to adhere the slurry composition forming the positive electrode well to the current collector, which is well dissolved in a solvent and can form a conductive network between the positive electrode active material and the conductive material. The binder may be any binder known in the art without any particular limitation and may preferably be at least one selected from the group consisting of fluorine resin binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropyl cellulose, and regenerated cellulose; polyalcohol-based binders; polyolefin-based binders including polyethylene and polypropylene; polyimide-based binders; polyester-based binders; and silane-based binders; and mixtures or copolymers of two or more thereof.

In the present invention, the content of sodium contained in a positive electrode is the content of sodium contained in a positive electrode binder, and it is advantageous to select and use a binder material capable of minimizing the content of sodium. Thus, the content of sodium in the positive electrode binder may be no more than 450 ppm based upon the total content of sodium in the lithium secondary battery.

For example, the binder contained in the positive electrode may be at least one selected from the group consisting of lithiated poly(acrylic acid) (Li-PAA), poly(vinyl alcohol) (PVA), a random copolymer of the lithiated poly(acrylic acid) and the poly(vinyl alcohol) and a styrene butadiene rubber (SBR)-based binder.

The lithiated poly(acrylic acid) is a lithium substituted polymer formed by neutralizing hydrogen of poly(acrylic acid) with LiOH and substituting it with Li. At this time, the purity of the applied LiOH greatly affects the content of Na. The higher the purity of the LiOH is, the lower the content of Na in the LiOH is, and thus the content of Na in the resulting lithium substituted polymer, i.e., the binder, can be reduced. In addition, when performing the above-mentioned substitution operation, if a general vitreous reactor is used, Na present in the inside and the outside of the vitreous reactor may be dissolved out by a strong base or a strong acid material. Therefore, it may be preferable to use a plastic reactor.

The polyvinyl alcohol is generally known to hydrolyze polyvinyl acetate by adding NaOH, and at this time, NaOH may affect the content of Na. Therefore, it is possible to remove Na ions by rinsing or dialyzing the polymer after hydrolysis using a mixed solvent of water and an appropriate alcohol, etc. It is also possible to hydrolyze by using LiOH instead of NaOH.

In the case of a rubber-based emulsion binder such as SBR, sodium dodecyl sulfate (SDS) is generally added as an emulsifier when emulsion polymerization is carried out, but when the polymerization is performed while changing to lithium dodecyl sulfate, Na ions can be minimized.

The content of the binder may be 3 to 10 wt. %, preferably 5 to 10 wt. %, and more preferably 7 to 10 wt. % based on the total weight of the positive electrode active material layer. If the content of the binder is less than the above range, the physical properties of the positive electrode may deteriorate and the positive electrode active material and the conductive material may be detached. If the content of the binder is more than the above range, the ratio of the active material and the conductive material in the positive electrode may be relatively decreased and the capacity of the battery may be decreased. Therefore, it is preferable to determine the optimum content within the above range.

The conductive material among the components constituting the positive electrode active material layer in the positive electrode of the present invention is for enhancing the electrical conductivity and is not particularly limited as long as it is an electron conductive material which does not cause chemical changes in the lithium secondary battery.

The conductive material may generally be carbon black, graphite, carbon fiber, carbon nanotube, metal powder, electrically conductive metal oxide, an organic conductive material, etc. Products that are currently marketed as conductive material may comprise acetylene black series (products from Chevron Chemical Company or Gulf Oil Company), Ketjen Black EC series (products from Armak Company), Vulcan XC-72(a product from Cabot Company) and Super P (a product from MMM). For example, acetylene black, carbon black, graphite and the like can be used.

The content of the conductive material may be 2 to 10 wt. %, preferably 3 to 10 wt. %, more preferably 5 to 10 wt. %. If the content of the conductive material contained in the positive electrode is less than the above range, the amount of the unreacted sulfur in the electrode increases and eventually the capacity is reduced. If the content exceeds the above range, it will adversely affect the high-efficiency discharging characteristics and the charging/discharging cycle lifetime. Therefore, it is preferable to determine the optimum content within the above-mentioned range.

Negative Electrode

In the present invention, the negative electrode of the lithium secondary battery may comprise a negative electrode current collector and a negative electrode active material layer formed on the negative electrode current collector. The negative electrode active material layer may comprise a negative electrode active material, a binder, and a conductive material, and may optionally further comprise a negative electrode additive.

The content of sodium contained in the negative electrode among the total content of sodium contained in the lithium secondary battery may be no more than 15 ppm based on the total content in lithium secondary battery. For example, if the total content of sodium in the lithium secondary battery is 500 ppm based on the total content in the lithium secondary battery, the content of sodium contained in the negative electrode may be 15 ppm based on the total content in the lithium secondary battery.

Specifically, the content of sodium contained in the negative electrode among the total content of sodium contained in the lithium secondary battery may be no more than 15 ppm, or no more than 12 ppm, or no more than 10 ppm, or no more than 8 ppm, or no more than 6 ppm, or no more than 4 ppm, or no more than 2 ppm, or no more than 1 ppm based on the total content in the lithium secondary battery.

The lower the content of sodium contained in the negative electrode based on the total content in the lithium secondary battery is, the more likely it will be advantageous in performance and lifetime characteristics of the battery. On the contrary, as the content of sodium contained in the negative electrode increases, the capacity and the Coulomb efficiency of the battery may decrease depending on the progress of charging/discharging cycles.

The negative electrode active material among the components constituting the negative electrode active material layer in the negative electrode of the present invention may be a lithium metal or a lithium alloy. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The components such as the current collector, the binder, the conductive material, and the additive except for the negative electrode active material may correspond to the current collector, the binder, the conductive material, and the additive used in the positive electrode.

Separator

In the present invention, the separator of the lithium secondary battery is a separator having a function of physically separating the positive electrode and the negative electrode. The separator can be used without special restrictions, as long as it is used as a conventional separator. Particularly, a separator with excellent electrolyte solution humidification ability while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material having a porosity of 30 to 50%.

The separator may be an insulating thin film having high ion permeability and mechanical strength. The pore diameter of the separator is generally 0.01 to 10 μm, and the thickness may be generally 5 to 20 μm.

The separator may be, for example, an olefin-based polymer such as polypropylene; a sheet or a nonwoven fabric made of glass fiber, polyethylene, or the like. When a solid polymer electrolyte is used as the electrolyte, a solid polymer electrolyte may also serve as an electrolyte.

Specific examples of the separator may be polyethylene, polypropylene, polyvinylidene fluoride, or a multilayer film of two or more thereof, or may be a mixed multilayer film such as a two-layer separator of polyethylene/polypropylene, a three-layer separator of polyethylene/polypropylene/polyethylene, a three-layer separator of polypropylene/polyethylene/polypropylene.

The separator itself does not contain sodium. However, during the operation of the battery, the sodium contained in the sodium containing other components of the lithium secondary battery, i.e., the positive electrode, the negative electrode, and the electrolyte may penetrate into the separator and thus the separator can contain sodium.

The content of sodium contained in the separator among the total content of sodium contained in the lithium secondary battery may be no more than 10 ppm based on the total content in the lithium secondary battery. For example, if the total content of sodium in the lithium secondary battery is 500 ppm based on the total content in the lithium secondary battery, the content of sodium in the separator may be 10 ppm based on the total content in the lithium secondary battery.

Specifically, the content of sodium contained in the positive electrode among the total content of sodium contained in the lithium secondary battery may be no more than 10 ppm, or no more than 8 ppm, or no more than 6 ppm, or no more than 5 ppm, or no more than 4 ppm, or no more than 3 ppm, or no more than 2 ppm, or no more than 1 ppm based on the total content in the lithium secondary battery.

The lower the content of sodium contained in the separator based on the total content in the lithium secondary battery is, the more likely it will be advantageous in performance and lifetime characteristics of the battery. On the contrary, as the content of sodium contained in the negative electrode increases, the capacity and the Coulomb efficiency of the battery may be decreased depending on the progress of charging/discharging cycles.

Electrolyte

In the present invention, the electrolyte solution contained in the lithium secondary battery may comprise a non-aqueous solvent and a lithium salt, and may optionally further comprise an additive. If the non-aqueous solvent, the lithium salt, and the additive with high purity are used in the electrolyte solution, the content of sodium ion may be reduced.

The content of sodium contained in the negative electrode among the total content of sodium contained in the lithium secondary battery may be no more than 25 ppm based on the total content in the lithium secondary battery. For example, if the total content of sodium contained in the lithium secondary battery is 500 ppm based on the total content in the lithium secondary battery, the content of sodium contained in the negative electrode may be 25 ppm based on the total content in the lithium secondary battery.

The content of sodium contained in the negative electrode among the total content of sodium contained in the lithium secondary battery may be no more than 25 ppm, or no more than 20 ppm, or no more than 15 ppm, or no more than 10 ppm, or no more than 8 ppm, or no more than 6 ppm, or no more than 4 ppm, or no more than 3 ppm based on the total content in the lithium secondary battery.

The lower the content of sodium contained in the electrolyte solution based on the total content in the lithium secondary battery is, the more likely it will be advantageous in views of performance and lifetime characteristics of the battery. On the contrary, as the content of sodium contained in the electrolyte solution increases, the capacity and the Coulomb efficiency of the battery may be reduced. Specifically, sodium ions migrate toward the lithium negative electrode, and may interfere with the uniform reaction activity of the surface of the lithium negative electrode while occurring an undesired side reaction on the surface of lithium. In addition, the non-uniform reaction of lithium may adversely affect the lifetime of the battery because the phenomenon in which the side reaction and consumption of the electrolyte solution on the surface are sharply accompanied occurs.

The non-aqueous solvent is not particularly limited as long as it is a non-aqueous solvent that acts as a medium through which ions involved in the electrochemical reaction of the battery can move.

For example, the non-aqueous solvent may be a carbonate-based, ester-based, ether-based, ketone-based, alcohol-based or aprotic solvent.

The carbonate-based solvent may specifically be dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc.

The ester-based solvent may specifically be methyl acetate, ethyl acetate, n-propyl acetate, 1,1-dimethyl ethyl acetate, methyl propionate, ethyl propionate, γ-butyrolactone, decanolide, valerolactone, mevalonolactone, carprolactone, etc.

The ether-based solvent may specifically be diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, or polyethylene glycol dimethyl ether, etc. The ketone-based solvent may specifically be cyclohexanone, etc. The alcohol-based solvent may specifically be ethylalcohol, or isopropylalcohol, etc. The aprotic solvent may specifically be nitriles such as acetonitrile, amides such as dimethylformamide, dioxolanes such as 1,3-dioxolane (DOL), or sulfolane, etc. The non-aqueous organic solvents may be used alone or in combination of one or more. The mixing ratio when using in combination of one or more can be appropriately adjusted depending on the desired performance of the battery. In particular, a mixed solution of 1:1 volume ratio of 1,3-dioxolane and dimethoxyethane may be preferable.

Among the above-mentioned electrolyte solutions, the carbonate-based solvents can be used for a lithium metal ion battery, and the ether-based solvents can be used for a lithium-sulfur battery.

The lithium salt may be at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F9SO_3$, $LiN(C_2F_5SO_3)_2$, $LiN(C_2F_5SO_2)_2$, $LiN(CF_3SO_2)_2$, $LiN(CaF_{2a+1}SO_2)(CbF_{2b+1}SO_2)$ (wherein a and b are natural numbers, preferably $1 \leq a \leq 20$ and $1 \leq b \leq 20$), LiCl, LiI and $LiB(C_2O_4)_2$. Preferably, when using at least one of LiFSI and LiTFSI among the lithium salts mentioned above, it may be advantageous to minimize the content of sodium.

The shape of the lithium secondary battery of the present invention is not particularly limited and may be various shapes such as a cylindrical shape, a laminate shape, and a coin shape that can operate as a battery.

In addition, the present invention provides a battery module including the lithium secondary battery as a unit cell and a battery pack including the same.

The battery pack may be used as a power source of medium or large-sized devices requiring high temperature stability, long cycle characteristics, and high capacity characteristic.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (Escooter); an electric golf cart; and a power storage system.

As described above, the lithium secondary battery according to the present invention can have the improved lifetime characteristic and capacity of the battery by minimizing the content of sodium contained in the positive electrode, the negative electrode, the separator and the electrolyte.

The lithium secondary battery may comprise all batteries using lithium metal as a negative electrode, and may be, for example, a lithium-sulfur battery.

Hereinafter, it will be apparent to those skilled in the art that although the preferred examples are shown to facilitate understanding of the present invention, the following examples illustrate only the present invention and various changes and modifications may be made within the scope and spirit of the present invention. It is also natural that such variations and modifications are within the scope of the appended claims.

Example 1

A positive electrode was prepared by forming a coating film for forming a positive electrode active material layer on an Al foil by a mathis coater using a slurry for forming the positive electrode active material layer, and then heating and drying at 50° C. for 2 hours. At this time, the slurry for forming the positive electrode active material layer was prepared by mixing a positive electrode active material, a conductive material, and a binder at a weight ratio of 90:5:5. The positive electrode active material was S/CNT composite, the conductive material was VGCF (vapor grown carbon fiber), and the binder was AD-B02/CMC. AD-B02/CMC is a binder in which two binders, namely AD-B02 (styrene-butadiene rubber binder particle) and CMC (carboxymethyl cellulose) are mixed at a weight ratio of 3.5:1.5.

The separator was a porous polyethylene polymer separator with a porosity of 50%.

The electrolyte solution was an electrolyte solution in which TE was dissolved. TE is an electrolyte solution formed by adding $LiN(CF_3SO_2)_2$ and $LiNO_3$ as a salt and an additive respectively to a mixed solvent of 2-methyl THF (2-methyl tetrahydrofuran)/EGEME (ethylene glycol ethyl methyl ether).

The weight ratio of the electrolyte solution and sulfur (electrolyte solution/S) in the positive electrode was maintained at 2.5.

The negative electrode was a lithium metal negative electrode.

The separator was interposed between the positive electrode and the negative electrode, and after housing it in a battery case, the electrolyte solution was injected to prepare a lithium-sulfur battery.

Example 2

A lithium-sulfur battery was produced in the same manner as in Example 1, except that a slurry for forming a positive electrode active material layer prepared by mixing the positive electrode active material, the conductive material, and the binder in a weight ratio of 87:5:8 was used, and Li-PAA/PVA was used as the binder. Li-PAA/PVA is a mixed binder of lithium-substituted poly(acrylic acid) (PAA) and poly(vinyl alcohol) (PVA). At this time, PAA used in Li-PAA is a mixture of PAAs with molecular weights of 450,000 and 1,250,000, respectively. If PAA is neutralized with LiOH (or $LiOH·H_2O$) (stirring at 60 to 80° C.) and thus pH is adjusted to 7.5 to 8.5, Li-PAA substituted by lithium at 90% or more can be prepared. PVA is slightly different in dispersion effect depending on the degree of saponification and the molecular weight, and the degree of saponification of PVA applied in the example is 85%, and the degree of polymerization is 300.

Example 3

A lithium-sulfur battery was produced in the same manner as in Example 1, except that a slurry for forming a positive electrode active material layer prepared by mixing the positive electrode active material, the conductive material, and the binder in a weight ratio of 87:5:8 was used, and LI-PAA(EC: Electrochemical Grade)/PVA was used as the binder. LI-PAA(EC)/PVA is a mixed binder of lithium-substituted poly(acrylic acid) and poly(vinyl alcohol). The Na content in the prepared LI-PAA(EC) was minimized by using high purity $LiOH·H_2O$ in neutralization of PAA.

Example 4

A lithium-sulfur battery was manufactured in the same manner as in Example 1 except that AD-B02_LDS/HP Li-AG (Highly pure random copolymer consisting of lithiated acrylic acid and vinyl alcohol) was used as a binder. AD-B02_LDS/HP Li-AG is a mixed binder of AD-B02_LDS and HP Li-AG. AD-B02_LDS was the same rubber binder as AD-B02 of Example 1, but has a reduced sodium content by using lithium dodecyl sulfate (LDS) instead of sodium dodecyl sulfate (SDS) as an emulsifier added at the time of production. HP Li-AG is a water-based binder composed of a copolymer of PVA and Li-PAA.

Example 5

A lithium-sulfur battery was produced in the same manner as in Example 4 except that HP TE was used as an electrolyte solution. HP TE refers to high purity TE, and the content of Na contained in HP TE is 5 ppm.

Example 6

A lithium-sulfur battery was manufactured in the same manner as in Example 1 except that the positive electrode binder was BM451B/Li-CMC instead of AD-B02/CMC. The content of Na contained in BM451B/Li-CMC is 483 ppm. BM451B/Li-CMC is a mixed binder of BM-451B (ZEON) and CMC. BM-451B (ZEON) is an SBR-based binder, and Li-CMC was substituted with a large amount of Li by three-time repetition of the process of acid treatment of Na-CMC with HCl-filtration/neutralization by LiOH, and the remaining amount of Na was decreased from level of 9% to 0.5%.

Comparative Example 1

A lithium-sulfur battery was manufactured using BM-451B/CMC as a binder and D2E as an electrolyte solution. BM-451B/CMC is a mixed binder of BM-451B (ZEON) and CMC. BM-451B (ZEON) is an SBR-based binder. D2E is an electrolyte solution formed by adding LiFSI and $LiNO_3$ to a mixed solvent of DOL (1,3-dioxolane), DME (1,2-dimethoxyethane), and EGEME (ethylene glycol ethyl methyl ether).

Comparative Example 2

A lithium-sulfur battery was manufactured in the same manner as in Example 1, except that the electrolyte solution was an electrolyte solution prepared by adding NaI as an electrolyte solution additive instead of the TE electrolyte solution to adjust the Na content artificially. The content of Na contained in the electrolyte solution is 120 ppm.

Experimental Example 1: Measurement of Na Content

The contents of Na contained in the lithium-sulfur batteries manufactured in Examples 1 to 6 and Comparative Examples 1 and 2, and the positive electrode, the negative electrode, the separator and the electrolyte solution constituting the lithium-sulfur battery respectively were measured by the following methods.

[Method for Measuring Na Content]

(1) Pretreatment of Positive and Negative Electrodes

For the analysis of impurities comprising Na, 0.1 g of the sample was collected into a vial in an aliquot (0.02 g of a sample was collected in an aliquot for the main composition analysis).

2 mL of 36-38% hydrochloric acid was added to the collected sample aliquot and the sample was dissolved by shaking until completely dissolved.

If the sample was dissolved clearly, the vial was heated in the hot plate at 100° C. to volatilize.

Thereafter, after cooling the sample to room temperature, the internal standard (1000 mg/L, 100 μL, Sc) was added, diluted with ultrapure water to a final volume of 10 mL and analyzed with ICP-OES (Optima 8300DV, Perkin-Elmer).

(2) Pretreatment of Electrolyte Solution and Separator

For the analysis of impurities comprising Na, 0.2 to 0.5 g of the sample was collected into a platinum crucible in an aliquot.

2 mL of 96% sulfuric acid was added, and the temperature was slowly raised to 430° C. in the hot plate to carbonize it.

If the occurrence of white smoke ceases, it was cooled to room temperature and then the ashing process was performed in the electric furnace. The ashing condition is as shown in Step 1 and Step 2 below:

Step 1: Rising the temperature to 200° C. for 1 hour, maintaining for 1 hour; and Step 2: Rising the temperature to 400° C. for 2 hours, maintaining for 2 hours, rising to 650° C. for 3 hours, and maintaining for 3 hours.

Thereafter, 1 mL of 65% nitric acid and 0.1 mL of hydrogen peroxide were added to the asked residue to dissolve the sample clearly.

Internal standard (1000 mg/L, 100 µL, Sc) were added and diluted with ultrapure water to a final volume of 10 mL and analyzed with ICP-OES (Optima 8300DV, Perkin-Elmer).

(3) ICP-OES Analysis Method

Standard solutions were prepared as blank, 1 mg/L, 4 mg/L, and 10 mg/L, respectively and calibration curve was constructed. The standard solution was prepared to contain Sc at a concentration of 10 mg/L as an internal standard. Analysis was performed in radial view mode using ICP-OES (Optima 8300DV, Perkin-Elmer).

The measurement conditions are as follows:

Plasma gas flow: 10-12 L/min
Auxiliary gas flow: 0.2-0.4 L/min
Nebulizer gas flow: 0.8-0.9 L/min
RF power: 1300-1500 W
Pump flow rate: 1.0-1.5 mL/min The measured wavelength for Na analysis was 589.592 nm (in the case of wavelength interference, 330.237 nm or 588.995 nm can be selected).

If the measured concentration of the analytical sample did not fall within the calibration curve range, it was further diluted and then measured.

The contents of Na contained in each of the lithium-sulfur batteries prepared in Examples 1 to 6 and Comparative Examples 1 and 2 and the positive electrode, the negative electrode, the separator and the electrolyte solution of the lithium-sulfur batteries were measured and the results are shown in Table 1 below.

TABLE 1

| | Positive electrode | | | | | | Lithium-sulfur battery Na content (ppm) |
|---|---|---|---|---|---|---|---|
| | Positive electrode active material (Na content, ppm) | Conductive material (Na content, ppm) | Binder (Na content, ppm) | Separator | Electrolyte solution (Na content, ppm) | Negative electrode | |
| Example 1 | S/CNT composite (0) | VGCF (0) | AD-BO2/CMC (399.8) | Polyethylene polymer separator | TE (7.6) | Lithium metal | 418.6 |
| Example 2 | | | Li-PAA/PVA (12.8) | | TE (7.5) | negative electrode | 31.4 |
| Example 3 | | | Li-PAA(EC)/PVA (8.4) | | TE (7.5) | (11.1) | 27.0 |
| Example 4 | | | AD-BO2_LDS/HP Li-AG (1.2) | | TE (7.6) | | 20.0 |
| Example 5 | | | AD-BO2_LDS/HP Li-AG (1.2) | | HP TE (2.5) | | 14.9 |
| Example 6 | | | BM-451B/Li-CMC (460) | | TE (7.6) | | 478.7 |
| Comparative Example 1 | | | BM-451B/CMC (516.5) | | D2E (8.4) | | 536.1 |
| Comparative Example 2 | | | AD-BO2/CMC (399.8) | | Electrolyte solution additive: NaI (120) | | 530.9 |

Experimental Example 2: Measurement of Lifetime Characteristic

The lithium-sulfur batteries manufactured in Examples and Comparative Examples were measured for capacity retention ratio depending on charging/discharging cycles, and the results are shown in Table 2.

<Conditions of Charging/Discharging Cycle>

Cycle temperature: 25° C.
C-rate: 0.1 C (2.5 times)→0.2 C (3 times)→0.3 C charging/0.5 C discharging (constant current mode)
V cut-off: 1.8~2.5 V

TABLE 2

| | Capacity retention ratio (relative to 0.5 C first discharge capacity) @ cycle |
|---|---|
| Example 1 | <50% @ 30 cycles |
| Example 2 | 97~98% @ 100 cycles |
| Example 3 | 98~99% @ 100 cycles |
| Example 4 | 98~99% @ 100 cycles |
| Example 5 | 98.5~99.5% @ 100 cycles |
| Comparative Example 1 | <30% @ 20 cycles |

Referring to the above Table 2, it can be seen that the degradation time of the cell at Example 1 (Na content: 418.6 ppm) was improved as compared with Comparative Example 1 (Na content: 536.1 ppm).

On the other hand, the comparison of Example 1 (Na content: 418.6 ppm) with Example 2 (Na content: 31.4 ppm)

showed that as the charging/discharging cycles proceed, the expression capacity of the battery of Example 1 is as low as level of 80 to 85% as compared with Example 2.

However, in the case of Example 3 (Na content: 27.0 ppm), Example 4 (Na content: 20.0 ppm) and Example 5 (Na content: 14.9 ppm), it was confirmed that the lifetime and the expression capacity of the battery were improved at the same time, and thus it was confirmed that it is desirable to reduce the Na content in the battery to a level of no more than 50 ppm.

As described above, as the Na content is decreased, the lifetime characteristic of the battery is lowered. Therefore, it can be seen that the presence of Na reduces the migration of lithium ions and decreases efficiency.

The invention claimed is:

1. A lithium-sulfur battery, comprising:
   a S/CNT composite positive electrode;
   a lithium metal negative electrode;
   a separator interposed between the positive electrode and the lithium negative electrode; and
   an electrolyte solution,
   wherein the positive electrode comprises a positive electrode material and a binder,
   wherein the binder comprises a random copolymer of lithiated poly(acrylic acid) (Li-PAA) and poly(vinyl alcohol),
   wherein the lithiated poly(acrylic acid) (Li-PAA) of the random copolymer is formed by neutralizing poly(acrylic acid) with LiOH, and
   wherein the poly(vinyl alcohol) of the random copolymer is formed by hydrolyzing polyvinyl acetate with LiOH,
   wherein the content of sodium in the positive electrode is no more than 2 ppm,
   wherein the content of sodium in the electrolyte solution is no more than 25 ppm, and
   wherein a total content of sodium in the lithium secondary battery is no more than 50 ppm.

2. The lithium secondary battery according to claim 1, wherein the content of sodium in the negative electrode is no more than 15 ppm.

* * * * *